United States Patent [19]
Roddy

[11] Patent Number: 5,509,246
[45] Date of Patent: Apr. 23, 1996

[54] SOLAR ROOF SHINGLE

[76] Inventor: Mark E. Roddy, 170 White Horse Pike, Absecon, N.J. 08201

[21] Appl. No.: 339,342

[22] Filed: Nov. 14, 1994

[51] Int. Cl.6 ...................................................... E04D 1/24
[52] U.S. Cl. .......................... 52/533; 52/220.1; 52/220.3; 52/220.5; 126/621; 126/622; 126/704; 126/705; 126/906; 126/623
[58] Field of Search ........................... 52/533, 534, 220.1, 52/220.3, 220.5, 560; 126/621, 622, 704, 705, 906, 623

[56] References Cited

U.S. PATENT DOCUMENTS

| | | | |
|---|---|---|---|
| 322,917 | 7/1885 | Donaldson | 52/533 |
| 4,192,116 | 3/1980 | Kelly | 52/518 X |
| 4,269,172 | 5/1981 | Parker et al. | 126/622 X |
| 4,291,683 | 9/1981 | Bayles | 52/533 X |
| 4,364,374 | 12/1982 | Brazzola | 126/622 X |
| 4,953,537 | 9/1990 | Allegro | 52/533 X |

FOREIGN PATENT DOCUMENTS 0010832  9/1990  WIPO ........................... 126/622

*Primary Examiner*—Carl D. Friedman
*Assistant Examiner*—Christopher Todd Kent
*Attorney, Agent, or Firm*—Norman E. Lehrer; Jeffrey S. Ginsberg

[57] ABSTRACT

A roof shingle for solar heat collection comprises an upper segment and a lower segment. The upper segment of the roof shingle has a greater thickness than the lower segment. The upper segment has a transverse opening extending therethrough for receiving hollow tubing inserted therein. The opening is adapted to be aligned with openings in adjacent roof shingles on either side of the roof shingle.

8 Claims, 2 Drawing Sheets

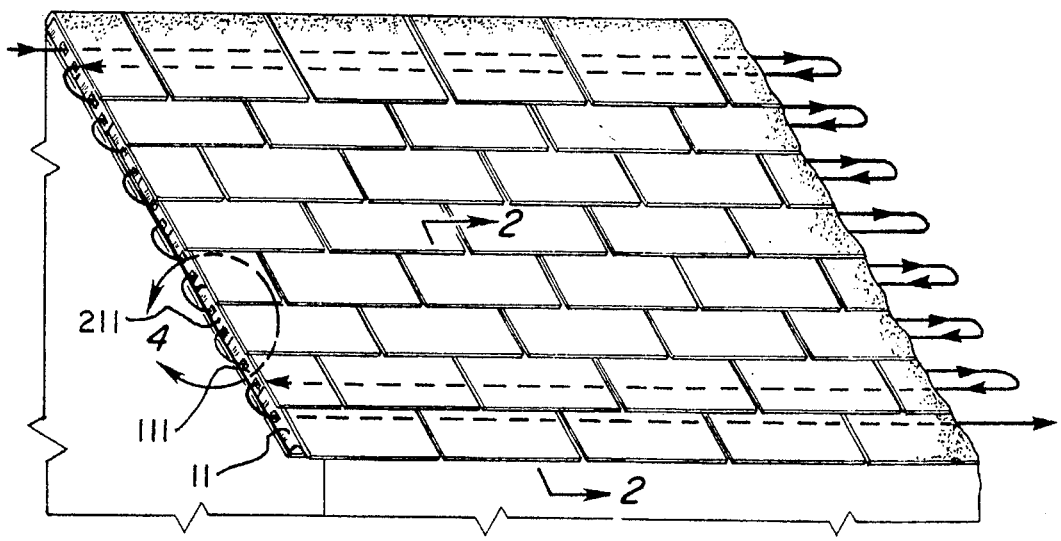
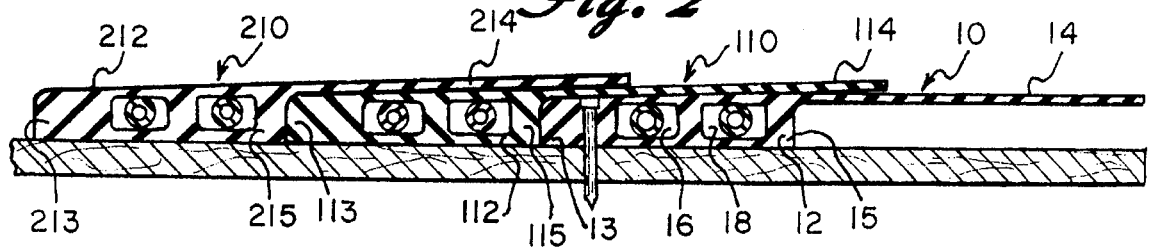
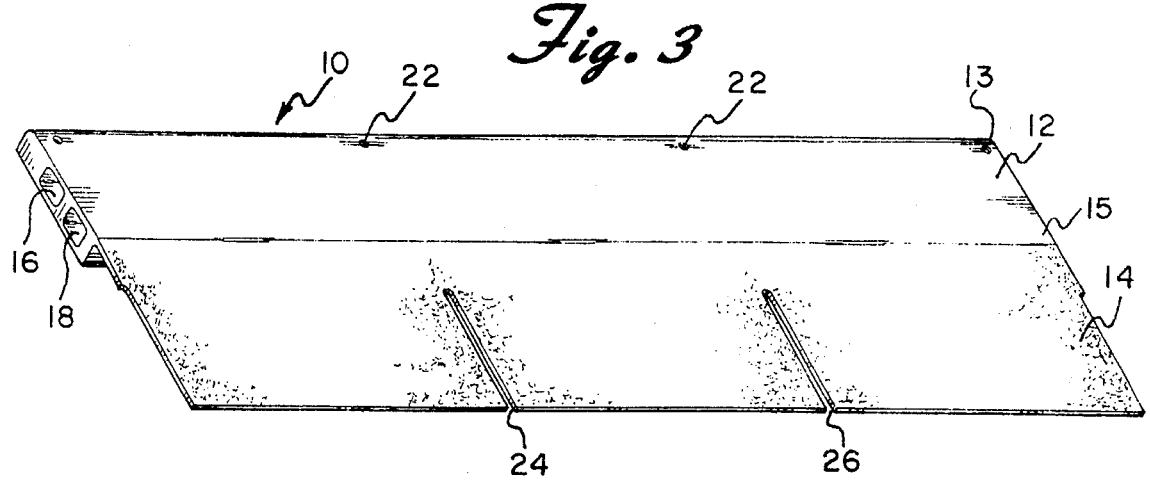

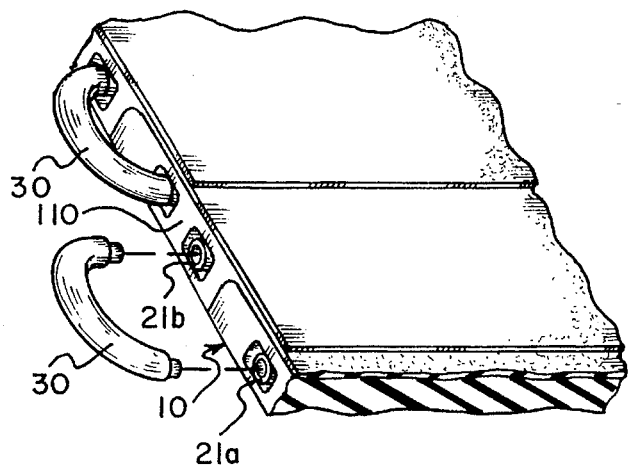
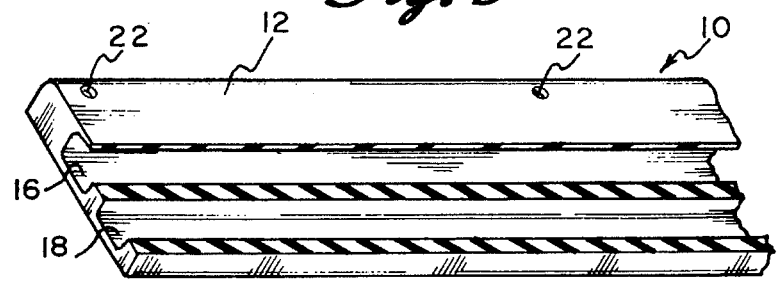
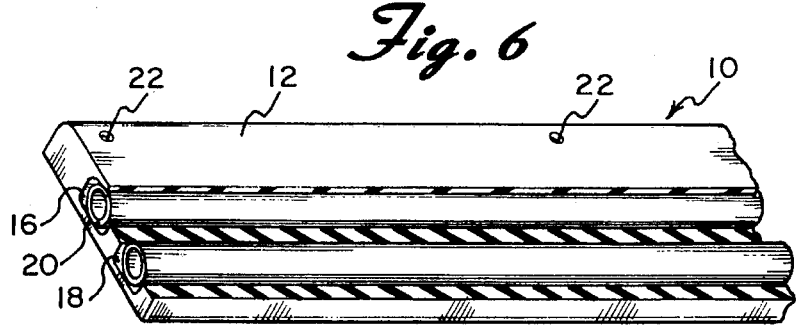
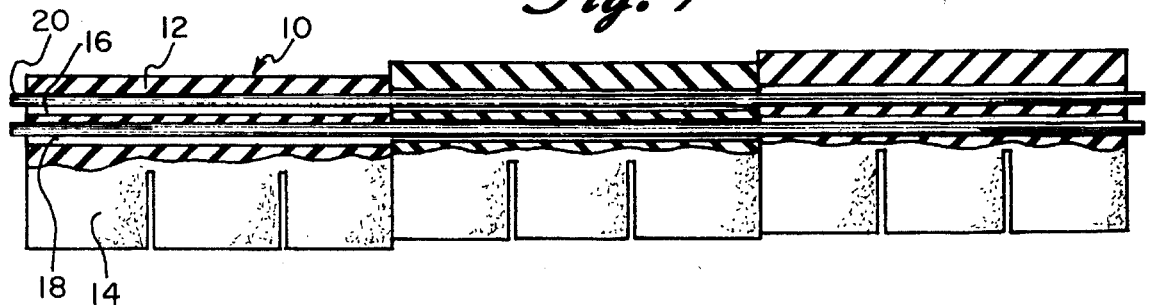

SOLAR ROOF SHINGLE

BACKGROUND OF THE INVENTION

The present invention is directed toward a roof shingle for solar heat collection and, more particularly, to such a shingle having fluid filled tubes inserted therein.

As prices for oil and electric heating continue to rise, there has been increasing notice given to alternative energy sources. One such source is solar energy. Many existing solar heating systems employ the use of relatively large solar heating panels. See, for example, U.S. Pat. Nos. 4,454,863 and 4,946,512. Installation of these panels is rather complicated and generally requires workers having a substantial amount of training. Additionally, the heating panels are quite expensive. Due to the high cost of installing such a solar heating system many people are deterred from utilizing this vast and readily available energy source. U.S. Pat. No. 4,158,357 suffers from the same deficiencies as the two patents discussed above.

Alternative solar roof systems have been developed. These systems employ the use of interfitting members having some form of heating system incorporated therewith. Again, common drawbacks with these existing solar roof systems are that they are both complicated to install and are relatively expensive. For example, U.S. Pat. No 4,319,437 discloses interlocking roof shingles which form circular openings between a corresponding upper and lower shingle. Fluid conduits are inserted into the circular openings. The conduits extend through adjacent shingles lying in the same course. Positioning adjacent shingles so that the circular openings are properly aligned is rather difficult. Accordingly, skilled workers generally have to be employed for proper installation.

U.S. Pat. No. 4,204,520 discloses roofing tiles with a solar water heating system associated therewith. Each roofing tile has a semicircular groove formed in one surface near the top thereof and a similar groove formed in the opposite surface near the bottom. When two courses are assembled on a roof, a tube is first positioned in the adjacent grooves formed in the tiles that make up the lower course. The adjacent grooves formed in the tiles that make up the upper course are mated with the grooves in the lower course. Therefore, the tube is encompassed by the overlapping portions of the tile. The tube is used to bring heated water to a house located below the roof. A problem with installing the roofing tiles disclosed in this patent is that the semicircular grooves in adjacent tiles must be precisely aligned so that the tubes can be inserted therein. Additionally, there is little room for expansion of the tubes.

SUMMARY OF THE INVENTION

The present invention is designed to overcome the deficiencies of the prior art discussed above. It is an object of the invention to provide a solar roof shingle that is easy to install.

It is a further object of the invention to provide a roof shingle that has an opening formed therein that can be readily aligned with openings formed in adjacent roof shingles.

It is a further object of the invention to provide such a shingle that is relatively inexpensive to manufacture.

In accordance with the illustrative embodiments, demonstrating features and advantages of the present invention, there is provided a roof shingle for solar heat collection comprising an upper segment and a lower segment. The upper segment has a greater thickness than the lower segment. The upper segment has a transverse opening extending therethrough for receiving hollow tubing inserted therein. The transverse opening has a diameter substantially larger than the diameter of the hollow tubing so that the opening can be aligned with openings in adjacent roof shingles.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of a roof comprised of the solar roof shingles of the present invention;

FIG. 2 is a cross-sectional view taken along lines 2—2 of FIG. 1;

FIG. 3 is a perspective view of an individual solar roof shingle;

FIG. 4 is a partial cross-sectional view taken along line 4 of FIG. 1;

FIG. 5 is a partial cross-sectional view taken along lines 5—5 of FIG. 3;

FIG. 6 is a view similar to FIG. 5 showing a pair of tubes inserted in the openings of the shingle, and FIG. 7 is a partial cross-sectional view of a number of adjacent solar roof shingles with tubing inserted therethrough.

DETAILED DESCRIPTION OF THE PREFERRED EMBODIMENT

Referring now to the drawings in detail wherein like reference numerals have been used throughout the various figures to designate like elements, there is shown in the figures a roof shingle constructed in accordance with the principles of the present invention and designated generally as 10.

As best seen in FIG. 3, a roof shingle 10 has an upper segment 12 and a substantially thinner and more flexible lower segment 14. The upper segment 12 has a first end 13 and a second end 15. The thickness of the upper segment increases from the first end 13 to the second end 15. The roof shingle 10 is preferably made of rubber. However, it can be made of metal, ceramic or other appropriate material.

In the preferred embodiment, the upper segment 12 of the roof shingle 10 has a pair of equally spaced transverse openings 16 and 18 formed therein. The openings run the entire length of the roof shingle 10. Hollow tubing 20 is fed through the openings in the manner described below. The hollow tubing 20 is filled with water that is supplied from a suitable source (not shown), at one end, and is delivered to a hot water storage tank or the like (not shown). The water can be mixed with anti-freeze to prevent freezing of the same. It should be noted that the tubes can be filled with other fluids in lieu of water. In addition, the hollow tubing can be one piece that can be inserted through the different courses or it can be comprised of individual tubes inserted through one course only and then connected together. The hollow tubing is preferably comprised of polyvinyl chloride.

The openings 16 and 18 size are substantially larger than the diameter of the hollow tubing 20 so that the hollow tubing extending through one shingle can be aligned with openings in adjacent shingles even though the shingles are not perfectly aligned (see FIGS. 5–7). Moreover, the larger size of the openings accommodates any expansion of the hollow tubing caused by the heating of the fluid located therein.

FIG. 2 shows a cross-section of several courses of assembled shingles. As seen therein, the lower segment 14 of shingle 10 in the lowermost course extends from the upper portion of the second end 15 of the upper segment 12. The lower segment 114 of shingle 110 in the next course is positioned atop the shingle 10 in the lower course and the second end 115 of the shingle 110 is positioned against the first end 13 of the shingle 10. The lower segment 114 is pressed against the shingle 10 since the thickness of the shingle 110 increases from the first end 13 to the second end 15 (see FIG. 2). This ensures a snug fit between successive shingles. As with conventional roofing shingles, the roofing shingle 10 of the present invention has a pair of spaced apart slits 24 and 26 extending toward the first segment 12. The slits allow the shingle to expand slightly without warping and to flex for better fit.

To facilitate an understanding of the principles associated with the foregoing apparatus, its operation will now be briefly described. The upper segment 12 of the shingle 10 is nailed to the bottom of the roof through holes 22. Adjacent roof shingles are secured to the roof in the same course in the identical manner as the previously secured shingle. In order to compensate for differences in the length of the sides of the roof, adjacent shingles may have to be placed higher or lower than the neighboring shingle. Since the size of openings 16 and 18 are substantially larger than the diameter of the hollow tubing 20, the tubing can be run through the entire course 11 of shingles even if the openings are not exactly aligned (see FIGS. 1 and 7).

After an entire course of roof shingles has been nailed to the roof, roof shingles are then secured to the next higher course 111 (see FIG. 1). This is accomplished by fitting the lower segment 114 of roof shingle 110 over the upper segment 12 of the roof shingle 10 as illustrated in FIG. 2. The second end 115 of the shingle 110 is pressed against the first end 13 of the shingle 10. Adjacent shingles in the second course 111 are then secured.

Once the requisite number of shingles in the second course have been secured to the roof, shingles in the next course 211 are secured in the manner described above. Succeeding courses are attached to the roof until the entire roof is covered with the roof shingles. In essence, the roof shingles of the present invention are installed in basically the same manner as conventional roof shingles and, therefore, do not require any special expertise.

In the preferred embodiment, hollow tubing 20 is then weaved through the openings in the upper segment of the roof shingles one course at a time in the manner illustrated in FIG. 1. Water is then supplied through one end of the tubing 20, while the other end is delivered to a suitable hot water storage tank or the like (not shown). Instead of having one length of tubing 20 fed through the openings in the roof shingles, individual tubes such as shown at 21a and 21b can be inserted through each of the courses as shown in FIG. 4. In such a case, end connectors 30 are secured to adjacent tubes 21a and 21b located in the upper segments of roof shingles 10 and 110 respectively.

The present invention may be embodied in other specific forms without departing from the spirit or essential attributes thereof and accordingly reference should be made to the appended claims rather than to the foregoing specification as indicating the scope of the invention.

I claim:

1. A roof shingle for solar heat collection comprising an upper segment with a first transverse opening extending therethrough, a lower segment, hollow tubing means extending through said first transverse opening in said upper segment and means for securing said shingle to said roof, said hollow tubing means being adapted to contain a fluid therein, said upper segment having a greater thickness than said lower segment, said first transverse opening being adapted to be aligned with openings in adjacent roof shingles on either side of said roof shingle and being substantially larger than the diameter of said hollow tubing means so that misaligned adjacent roof shingles can accommodate said hollow tubing means.

2. The roof shingle of claim 1 wherein said lower segment extends from the top of the upper segment, said lower segment being adapted to be placed atop a corresponding roof shingle positioned below the same.

3. The roof shingle of claim 1 further having a second transverse opening in said upper segment, said second transverse opening running substantially parallel to said first transverse opening, said hollow tubing means further extending through said second transverse opening, said second transverse opening being adapted to be aligned with corresponding second openings in adjacent roof shingles on either side of said roof shingle.

4. The roof shingle of claim 1 wherein said shingle is comprised of rubber.

5. The roof shingle of claim 3 wherein said hollow tubing means comprises a first tube inserted through said first transverse opening and a second tube inserted through said second transverse opening.

6. The roof shingle of claim 5 wherein said first and second tubes are comprised of polyvinyl chloride.

7. The roof shingle of claim 3 wherein said hollow tubing means is comprised of a single length of hollow tubing adapted to be fed through said first transverse opening and said second transverse opening in said upper segment.

8. The roof shingle of claim 2 wherein said upper segment has a first end and a second end, said second end having a greater thickness than said first end and said lower segment extending from said second end.

\* \* \* \* \*